United States Patent [19]

Saito et al.

[11] Patent Number: 4,470,687
[45] Date of Patent: Sep. 11, 1984

[54] IMAGE SENSING APPARATUS

[75] Inventors: Syuichiro Saito, Kanagawa; Tadashi Okino, Tokyo, both of Japan

[73] Assignee: Canon Kabushiki Kaisha

[21] Appl. No.: 537,633

[22] Filed: Sep. 30, 1983

[30] Foreign Application Priority Data

Oct. 6, 1982 [JP] Japan .................................. 57-175932

[51] Int. Cl.³ .............................................. G03B 7/08
[52] U.S. Cl. .................................. 354/435; 354/234.1; 354/271.1
[58] Field of Search .............. 354/435, 439, 440, 446, 354/451, 452, 453, 234.1, 271.1

[56] References Cited

U.S. PATENT DOCUMENTS

| | | | |
|---|---|---|---|
| 4,107,705 | 8/1978 | Hashimoto et al. | 354/440 |
| 4,322,145 | 3/1982 | Yamada et al. | 354/435 |
| 4,348,092 | 9/1982 | Hirohata et al. | 354/234.1 |
| 4,349,264 | 9/1982 | Tezuka et al. | 354/234.1 |
| 4,367,931 | 1/1983 | Kawai et al. | 354/453 |
| 4,390,262 | 6/1983 | Hirohata et al. | 354/234.1 |

*Primary Examiner*—Russell E. Adams
*Attorney, Agent, or Firm*—Toren, McGeady and Stanger

[57] ABSTRACT

An image sensing apparatus adapted for taking both motion pictures and still pictures includes a diaphragm which controls the quantity of light coming from an object to be photographed to a light receiving part; a first control circuit which variably controls the aperture value of the diaphragm while keeping the diaphragm in an open state; and a second control circuit which performs a control function to open and close the diaphragm.

20 Claims, 7 Drawing Figures

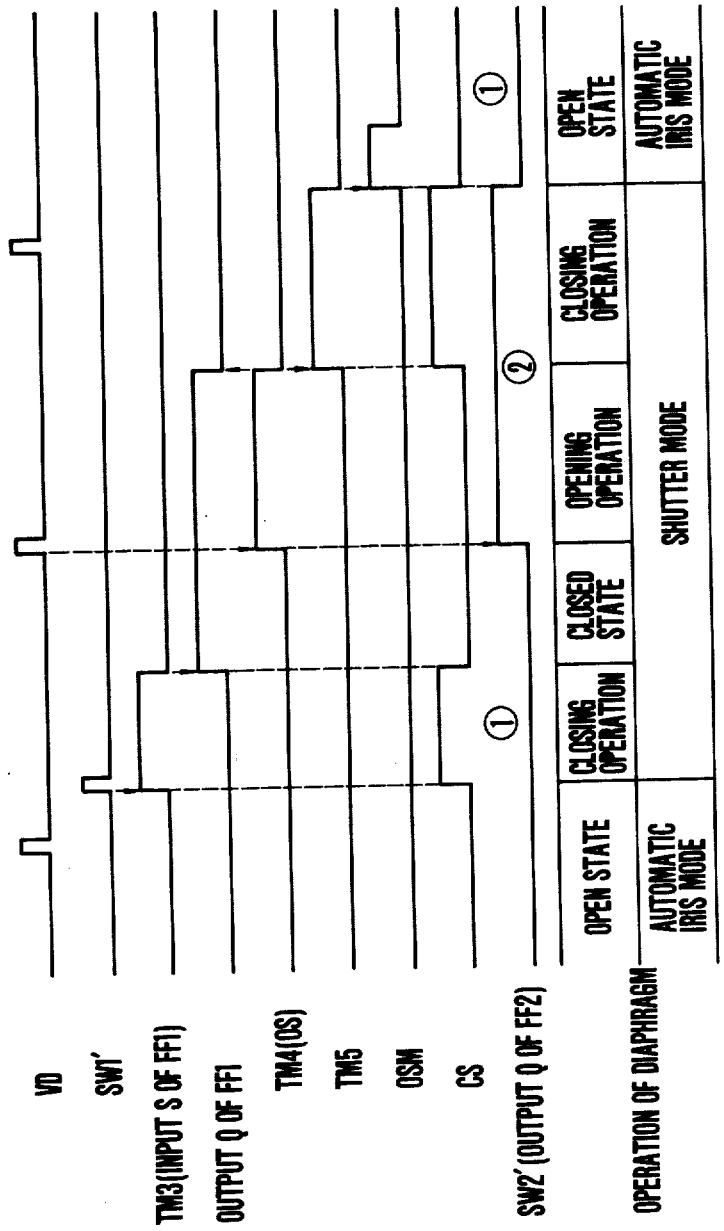

IMAGE SENSING APPARATUS

BACKGROUND OF THE INVENTION

1. Field of the Invention

This invention relates to an image sensing apparatus for sensing an image of an object to be photographed and more particularly to an image sensing apparatus adapted for taking both still pictures and motion pictures.

2. Description of the Prior Art

In an attempt to replace cameras adapted for conventional silver halide photographs, electronic cameras have been developed in recent years. These electronic cameras are arranged to convert a still picture image of an object to be photographed into an electrical signal by means of solid-state image sensors such as CCD, BBD or the like and to record the electrical signal thus obtained on a recording medium such as a magnetic sheet. The electronic cameras of this type are not only usable for still pictures but also usable as TV camera for taking motion picture images of objects to be photographed.

However, there are various points of difference between a TV camera for a motion picture and an electronic camera for a still picture though it is their common feature that they convert an object image into an electrical signal.

For example, in taking a still picture, use of a high speed shutter is necessary for an object moving at a high speed whereas a TV camera which is for a motion picture normally does not require shutter.

SUMMARY OF THE INVENTION

It is therefore an object of the present invention to provide an image sensing apparatus adaptable both for taking a still picture and for taking a motion picture to solve the above-stated problem. More specifically, in the apparatus according to the invention, a diaphragm which controls the quantity of light coming to a light receiving part from an object to be photographed is arranged to be used as a shutter for taking a still picture and also to be used as a so-called automatic iris to have its aperture value controlled while it is kept in an open state for taking a motion picture.

Another object of the invention is to provide an image sensing apparatus wherein a photo-electric conversion element such as a camera tube, a solid-state image sensor or the like is used as a light receiving part, with a diaphragm which controls the quantity of light incident on the photo-electric conversion element being arranged to be operated as an automatic iris by a first drive control means in taking motion pictures and to be operated as a shutter by a second drive control means in taking a still picture.

A further object of the invention is to provide an image sensing apparatus wherein there is provided detecting means for detecting the quantity of electricity corresponding to the quantity of light passing through the above-stated diaphragm with the aperture value of the diaphragm being controlled by the detection output of the detecting means when the diaphragm is operated as an automatic iris and with the degree of an exposure being controlled also by the detection output of the detecting means when the diaphragm is operated as a shutter.

These and further objects and features of the invention will become apparent from the following detailed description of preferred embodiments thereof taken in conjunction with the accompanying drawings.

BRIEF DESCRIPTION OF THE DRAWINGS

FIG. 6 is a timing chart showing the operation of the circuit shown in FIG. 5.

DETAILED DESCRIPTION OF PREFERRED EMBODIMENTS

Figure 1:
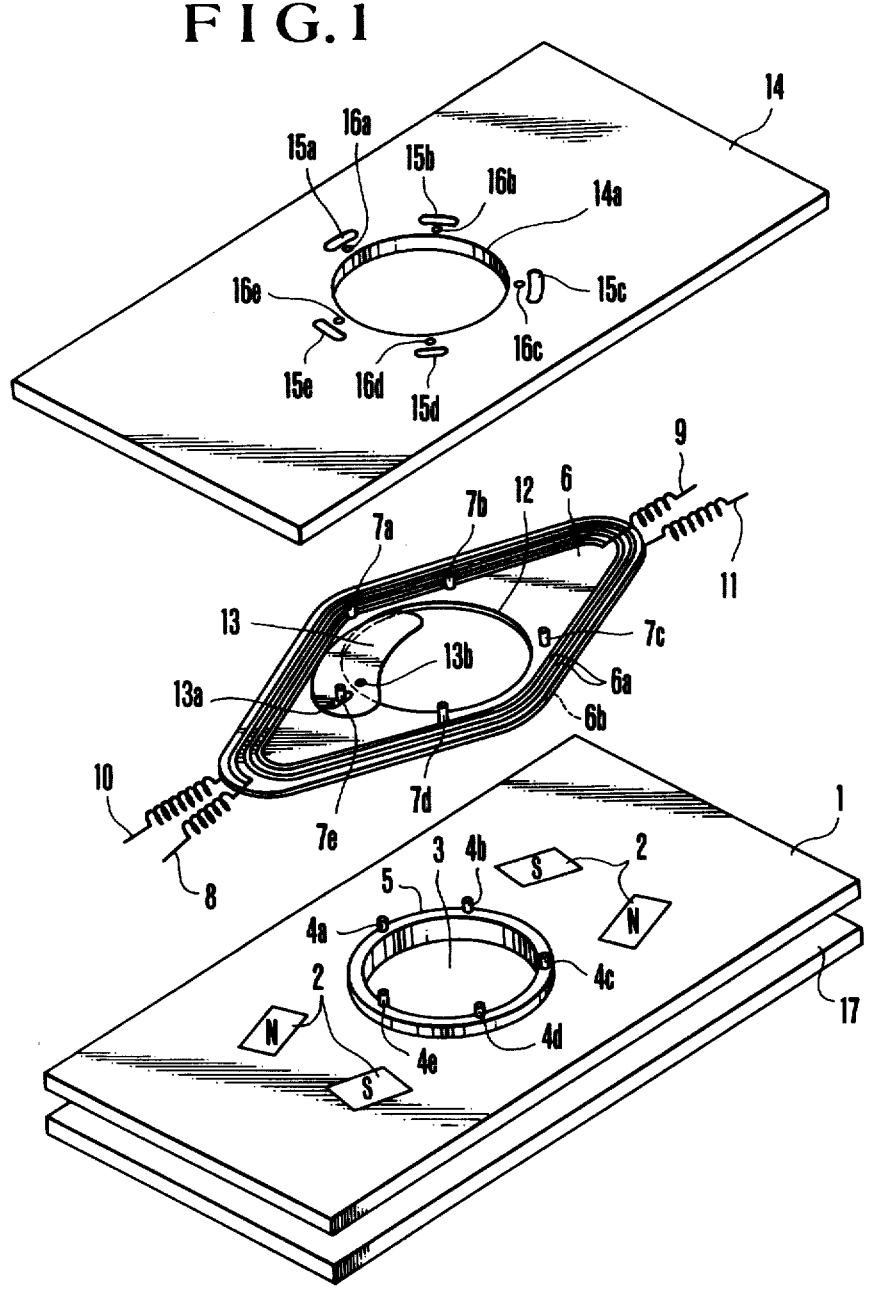
FIG. 1 is an exploded oblique view showing a diaphragm arranged in accordance with the present invention as an embodiment thereof.

FIG. 1 shows a diaphragm arranged as an essential part of an image sensing apparatus embodying the present invention exemplifying a first embodiment thereof. Referring to FIG. 1, the diaphragm includes a base plate 1 made of a non-magnetic material; permanent magnets 2 which are magnetized in a vertical direction as shown in FIG. 1; an aperture 3 for allowing a light flux from an object to be photographed to be incident upon a light receiving part of the photo-electric conversion type such as CCD or the like (not shown); a protrudent part 5 provided on the base plate 1; pins 4a–4e disposed on the protrudent part 5; a rotor 6 formed by a printed wire board; pins 7a–7e provided on the rotor 6; lead wires 8 and 9 which are arranged to be taken out from the upper side of the rotor 6 as viewed on the drawing; lead wires 10 and 11 which are arranged to be taken out from the lower side of the rotor 6; an aperture 12 which is arranged in a manner similar to the aperture 3; diaphragm blades 13 which are five in number though only one of them is shown for simplification of the drawing; a slot 13a which is provided in each of the diaphragm blades 13; a hole 13a which is provided in the diaphragm blade; a yoke 14 which is disposed and spaced at a prescribed distance from the rotor 6; an aperture 14a which is similar to the aperture 3; slots 15a–15e arranged in the yoke 14 to have the pins 7a–7e inserted therein; holes 16a–16e arranged in the yoke 14 to have the pins 4a–4e inserted therein; a yoke 17 which is provided with an aperture similar to the aperture 14a though the former is hidden in the drawing.

The four permanent magnets 2 and the yokes 14 and 17 form a magnetic circuit. The rotor 6 is interposed in between the permanent magnets 2 and the yoke 14. The rotor 6 is arranged to be rotated with a current is allowed to flow to the coils 6a and 6b disposed on the rotor 6. The aperture 12 of the rotor 6 is arranged to have the rotor rotate around the protrudent part 5. The diaphragm blades 13 are arranged so as to turn on the pin 7e by virtue of the slot 13a. Therefore, with the rotor rotated, the diaphragm blade 13 turns on the pin 4e to control the opening area of the aperture 12.

Figure 2:
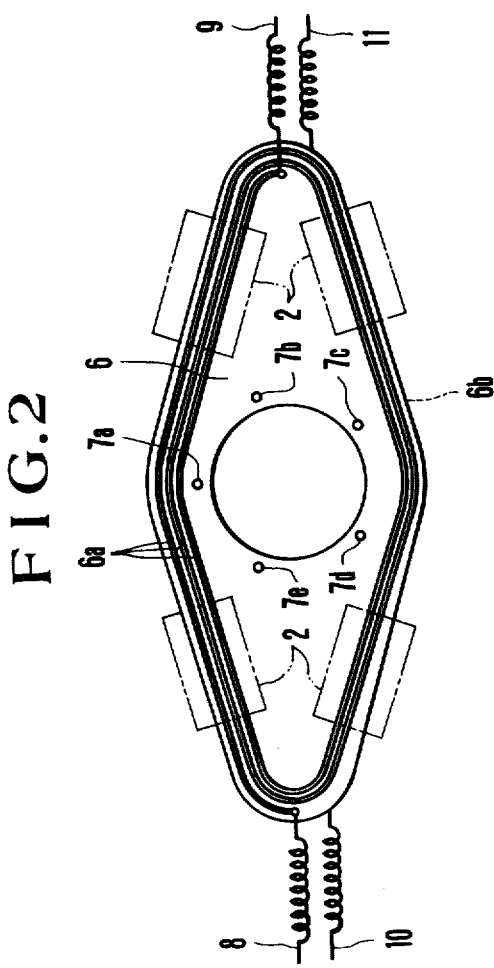
FIG. 2 is a plan view showing a rotor 6.

FIG. 2 is a plan view of the rotor 6. The driving coil 6a is made of a conductor and is disposed on the base plate of the rotor 6. The two ends of the coil 6a are connected to lead wires 8 and 9. The coil 6b which is of the same shape as the coil 6a is formed on the reverse side of the rotor 6 and is called a braking coil. The two ends of the braking coil 6b are connected to lead wires 10 and 11. The driving coil 6a and the braking coil 6b are positioned within a magnetic field formed by the permanent magnets 2. The diaphragm thus arranged is operatable an automatic diaphragm for taking motion pictures and also as a shutter for taking a still picture.

OPERATION AS AN AUTOMATIC IRIS

When the driving coil 6a is energized by a driving circuit which will be described later herein, a current flows within the magnetic field formed by the permanent magnets 2. Then, forces are produced in directions according to the left-hand rule of Fleming. The permanent magnets 2 are magnetized in the vertical direction in such a manner that the adjacent magnets have opposite polarity relative to each other as viewed on FIG. 1. These forces are thus produced along the four sides of the driving coil 6a and cause the rotor 5 to rotate on the protrudent part 5. The direction in which the rotor 6 rotates is controllable by the direction in which a current is allowed to flow to the driving coil 6a. The braking coil 6b moves into the magnetic field of the permanent magnets 2 in accordance with rotation of the rotor 6. Then, a voltage is produced between the lead wires 10 and 11.

In this specific embodiment, the diaphragm closes when a positive voltage is applied to the lead wire 9 of the driving coil 6a and a negative voltage to the lead wire 8 of the coil 6a. With the diaphragm closing in this manner, a positive voltage develops at the lead wire 11 of the braking coil 6b and a negative voltage at the other lead wire 10 of the braking coil 6b.

OPERATION AS A SHUTTER

In this case, the driving coil 6a and the braking coil 6b are connected either in parallel or in series. Both of them then operate as driving coils to open and close the diaphragm blades in conjunction with each other. With the two coils arranged to cooperate in this manner, the diaphragm blades can be operated at a high speed with a small amount of power consumption.

Figure 3A:
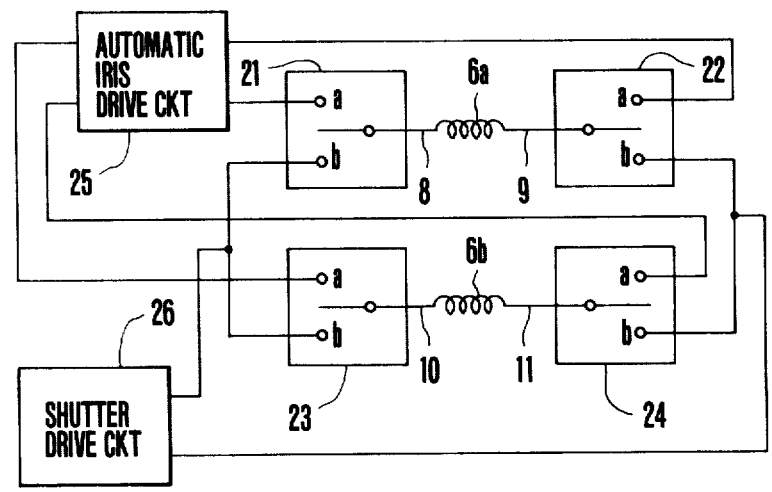
FIGS. 3(a) and 3(b) are circuit diagrams showing a connection change-over arrangement between a driving coil 6a and a brake coil 6b.
Figure 3B:
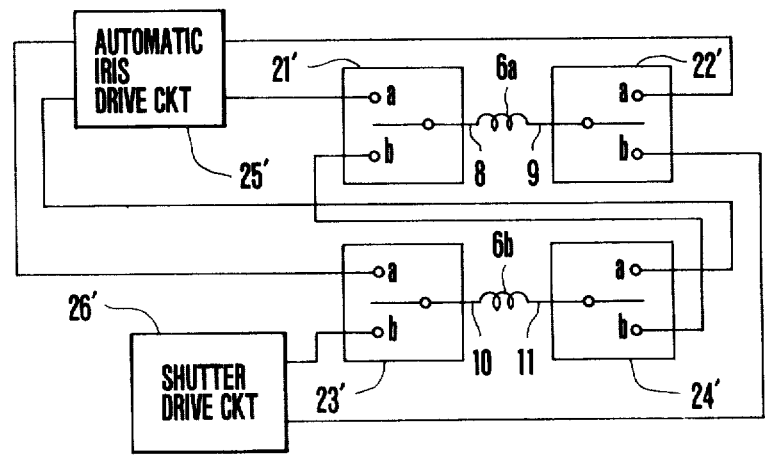

FIGS. 3(a) and 3(b) show the connection changeover arrangement between the driving coil 6a and the braking coil 6b. At the time of operation as a shutter, the driving coil 6a and the braking coil 6b are connected parallel to each other as shown in FIG. 3(a) in this specific example. In another example, they are connected in series as shown in FIG. 3(b).

Referring to FIGS. 3(a) and 3(b), reference numerals 21-24 and 21'-24' denote relay switches. Each of them is arranged to be connected to a terminal "a" for taking motion pictures and to a terminal "b" for taking a still picture. These drawings show an automatic iris drive circuit 25 or 25' and a shutter drive circuit 26 or 26'.

In the case of FIG. 3(a), the switches 21, 22, 23 and 24 are connected to the terminals (contacts) "a" for taking motion pictures. Then, the automatic iris control circuit 25 effects power supply to the driving coil 6a. A detection signal of the braking coil 6b is fed back to the control circuit 25 and the aperture value of the diaphragm is controlled while the diaphragm is left open. In taking a still picture, the switches 21, 22, 23 and 24 are connected to the terminal "b" to have the coils 6a and 6b connected in parallel and controlled by the shutter drive circuit 26.

In the example shown in FIG. 3(b), control is accomplished in exactly the same manner as in the case of FIG. 3(a) for taking motion pictures. Whereas, in taking a still picture, the coils 6a and 6b are series connected and are controlled by the shutter drive circuit 26'. In this specific embodiment, lead relays are employed as the switches. However, these relays may be replaced with transistors which are arranged to perform switching operation.

In the case where the embodiment is to be used as a lens shutter, the driving coil 6a and the braking coil 6b are allowed to cooperate with each other. This arrangement permits effective use of the magnetic field produced solely by the permanent magnets. Compared with the arrangement to control the diaphragm blades by the driving coil 6a alone, therefore, the embodiment permits operation of the diaphragm at a higher speed with less power consumption.

Figure 4:
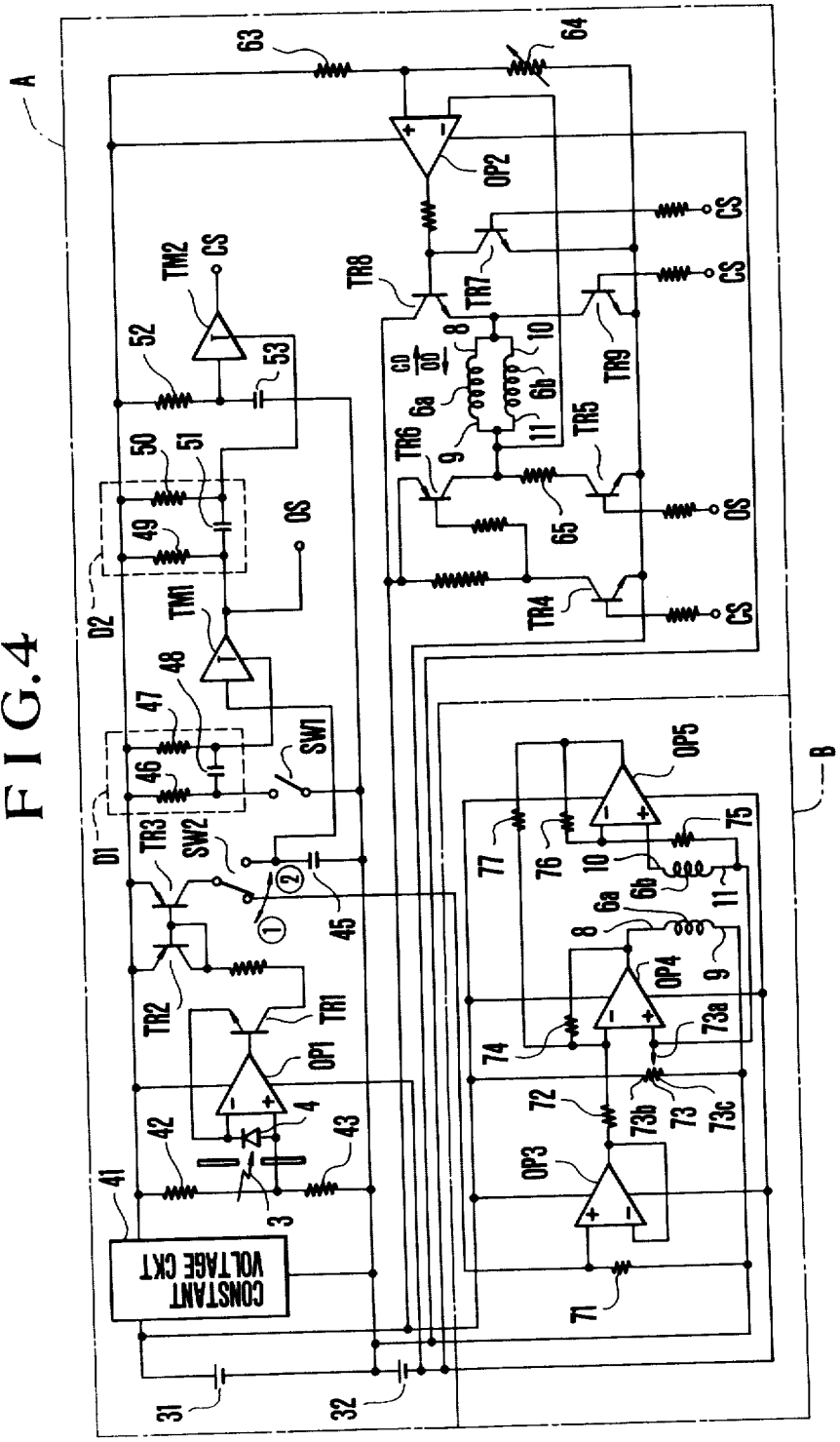
FIG. 4 is a circuit diagram showing the details of a diaphragm drive control circuit arranged to drive the diaphragm.

The details of the above-stated automatic iris drive circuit and the shutter drive circuit are arranged as shown in FIG. 4. In FIG. 4, A represents a drive circuit to operate the diaphragm as a half-open type shutter (single program shutter). B represents a drive circuit arranged to operate the diaphragm as an automatic iris. In this circuit arrangement, the driving current required for opening the shutter is arranged to be a constant current and to be supplied directly from batteries. The circuitry shown in FIG. 4 includes positive and negative power source batteries 31 and 32; a constant voltage circuit 41; an operational amplifier OP1; a light sensitive element 4 (such as silicon photo-cell or SPC) which is connected between the two input terminals of the operational amplifier OP1 and is disposed behind a diaphragm 3; voltage dividing resistors 42 and 43 which are arranged to determine the level of the non-inverting input terminal of the operational amplifier OP1; a transistor TR1 connected to the output terminal of the operational amplifier OP1; a transistor TR2 which is arranged to serve as a diode with the base and the collector thereof short-circuited; and another transistor TR3 the base of which is connected to the base of the transistor TR2. A switch SW2 is a change-over switch for selection between the motion picture mode and the still picture mode. The switch SW2 effects the motion picture mode when it is connected to a terminal ① to cause the diaphragm shown in FIGS. 1 and 2 to work as the automatic iris and brings about the still picture mode when it is connected to another terminal ② to cause the apparatus to work as a half-open type shutter. When the switch SW2 is closed on the side of the terminal ②, a capacitor 45 for time constant is connected to the collector of the transistor TR3.

A differentiation circuit D1 is formed by resistors 46 and 47 and a capacitor 48. A normally open switch SW1 is arranged to be closed by a shutter release operation. A timer circuit TM1 is arranged to have a trigger pulse supplied to a terminal T thereof. With the trigger pulse applied, the output level of the timer circuit TM1 becomes high to cause the capacitor 45 to begin to be charged. The output level of the timer circuit TM1 changes to a low level when the charge voltage of the capacitor 45 reaches erentiation circuit D2 which consists of resistors 49 and 50 and a capacitor 51; another timer circuit TM2 which is arranged to operate in the same manner as the timer circuit TM1; and a resistor 52 and a capacitor 53 which determine the time constant of the timer circuit TM2. The timer circuit TM2 is arranged to be triggered by the output of the differentiation circuit D2. Power supply to the coil 9 of a motor is controlled by a group of switching transistors TR4-TR9. The transistor TR5 has its base connected to the output terminal OS of the timer circuit TM1 via a resistor. The bases of the transistors TR4, TR7 and TR9 are connected to the output terminal CS of the timer circuit TM2. An operational amplifier OP2 forms a constant current circuit. A resistor 65 is provided for detecting the value of a shutter opening current. Voltage dividing resistors 63 and 64 are arranged to determine the level of the non-inverting input terminal of the operational amplifier OP2. The value of current at the time when the coils 6a and 6b of the motor are open is adjustable by adjusting the resistor 64. The inverting input terminal of the operational amplifier OP2 is connected to the collector of the transistor TR6.

The circuitry arranged as described above operates in the following manner:

CIRCUIT OPERATION AS A SHUTTER

When a shutter release operation is performed with a main switch MSW of the camera (not shown) closed, the switch SW1 closes. Then negative differential pulses are produced from the output terminal of the differentiation circuit D1. The timer circuit TM1 is triggered by the pulse. The output level of the timer circuit TM1 becomes a high level. At the same time, the capacitor 45 for time constant begins to be charged. With the output level of the timer circuit TM1 at the high level, a shutter opening signal OS is produced. The signal OS turns the switching transistor TR5 on. Meanwhile, a shutter closing signal CS is at a low level. Therefore, the switching transistors TR4, TR6, TR7 and TR9 are off while the switching transistor TR8 is on. Accordingly, power supply is effected from the battery 31 to the coils 6a and 6b of the motor in the direction of arrow OD via the switching transistors TR8 and TR5. With power supply effected to the coils, a shutter closing operation begins as described in the foregoing. Then, since the voltage of the resistor 65 for current detection is fed back to the inversion input terminal of the operational amplifier OP2 at that time, the current supplied to the coils 6a and 6b is kept constant. With the shutter opened further, when an aperture 3 is formed as shown in FIG. 1, light impinges SPC 4 for light measurement via the aperture 3. A current proportional to the quantity of the incident light flows to the collector of the transistor TR1. Then, the transistor TR2 causes a current equal to this current to flow to the collector of the transistor TR3. The time constant capacitor 45 begins to be charged with the current flowing to the collector of the transistor TR3. When the charge voltage of the capacitor 45 reaches a prescribed level, the output level of the timer circuit TM1 changes to a low level. This causes the switching transistor TR5 to turn off. With the transistor TR5 thus turned off, the power supply to the coils 6a and 6b in the direction of arrow OD is cut off. The instant the output level of the timer circuit TM1 changes to the low level, the differentiation circuit D2 produces negative differential pulses. The output of the timer circuit TM2 is then inverted by the pulse to a high level. Then, the capacitor 53 for time constant begins to be charged. Further, with the output level of the timer circuit TM2 inverted to the high level, a shutter closing signal OS is produced. This signal causes the switching transistors TR4, TR7 and TR9 to turn on. With the switching transistor TR7 turned on, the switching transistor TR8 turns off. Further, with the switching transistor TR4 turned on, the switching transistor TR6 turns on. Therefore, power supply is effected via the switching transistors TR6 and TR9 to the coils 6a and 6b of the motor in the direction of arrow CD. Then, the shutter begins to close.

When the shutter closes with the charge voltage of the time constant capacitor 53 at a prescribed level, the output level of the timer circuit TM2 changes to a low level. All the switching transistors TR4, TR6, TR7 and TR9 turn off to cut off the power supply to the coils 6a and 6b. The diaphragm is thus operated as a shutter. The length of the shutter opening time and the aperture value of the diaphragm are variably controlled on the basis of the output of light measurement to keep the quantity of exposure light of the light receiving part uniform.

OPERATION AS AN AUTOMATIC IRIS

The arrangement for operation as an automatic iris is as follows: Operational amplifiers OP3, OP4 and OP5 are connected in parallel to the positive and negative power sources 31 and 32 which are connected in series. The inverting input terminal of the operational amplifier OP3 is grounded via a resistor 71 while the non-inverting input terminal of the amplifier OP3 is connected to the output terminal thereof. The operational amplifier OP3 is thus arranged to serve as a voltage follower. The non-inverting input terminal of the operational amplifier OP4 is connected to the variable terminal 73a of a variable resistor 73. The fixed terminals 73b and 73c of the variable resistor 73 are respectively connected to the anode of the positive power source 31 and a grounding point. The inverting input terminal of the operational amplifier OP4 is connected to the output terminal of the operational amplifier OP3 via a resistor 72 while the output thereof is arranged to be grounded via the diaphragm driving coil 6a and, at the same time, is also feedback connected to the inverting input terminal of the operational amplifier OP4 via resistor 74. As mentioned in the foregoing, the driving coil 6a operates to close the diaphragm when a negative voltage is impressed thereon by the output of the operational amplifier OP4 and to open the diaphragm when a positive voltage is impressed thereon. The non-inverting input terminal of the operational amplifier OP5 is connected to the non-inverting input terminal of the operational amplifier OP4 via the diaphragm braking coil 6b. Meanwhile, the inverting input terminal of the operational amplifier OP5 is connected to the non-inverting input terminal of the operational amplifier OP4 via a resistor 75 and, at the same time, is connected to the output terminal thereof via a resistor 76. The output terminal of the operational amplifier OP5 is connected to the inverting input terminal of the operational amplifier OP4 via a resistor 77. At the braking coil 6b, a negative electromotive force is produced when the diaphragm is about to close while a positive electromotive force is produced when the diaphragm is about to open. The operation of the embodiment as automatic iris is performed in the following manner:

When the power source switch MSW (not shown) is closed, the operational amplifier OP3 produces a voltage which is proportional to the intensity of light incident upon a light sensitive element 4 passing through the diaphragm 3. If the intensity of the incident light is high and the voltage produced by the operational amplifier OP3 is higher than the potential of the non-inverting input of the operational amplifier OP4, the output voltage of the operational amplifier OP3 is invertingly amplified by the operational amplifier OP4.

As a result of that, the operational amplifier OP4 produces a negative voltage. The negative voltage is impressed on the driving coil to lower the quantity of light incident on the light sensitive element 4 by stopping down the diaphragm. Then, the stopping down movement of the diaphragm causes the electromotive force produced at the braking coil 6b as mentioned in the foregoing to be impressed on the non-inverting input terminal of the operational amplifier OP5. The electromotive force is then non-invertingly amplified by the operational amplifier OP5. As a result of that, a negative voltage is produced at the output terminal of the operational amplifier OP4. This negative voltage is impressed via the resistor 77 on the inverting input terminal of the operational amplifier OP4. The operational amplifier OP4 then inverts the negative voltage and produces it as a positive voltage component. During the aperture stopping process, the output that appears at the output terminal of the operational amplifier OP4 becomes a value obtained by adding a negative voltage produced by the operational amplifiers OP1 and OP3 and a positive voltage produced by the operational amplifier OP5. This output voltage causes the braking coil 6b to bring forth an electromotive force which serves to suppress the stopping down movement by subduing the driving voltage of the driving coil 6a. Assuming that the resistance values of the resistors 75 and 76 are R75 and R76, the non-inverting amplification gain of the operational amplifier OP5 is 1+R76/R75.

Conversely, when the output voltage of the operational amplifier OP3 is lower than the voltage of the variable terminal 73a of the variable resistor 73, i.e. the non-inverting input of the operational amplifier OP4, the positive voltage invertingly received and produced by the operational amplifier OP4 is impressed on the driving coil 6a to open the diaphragm. Then, a positive electromotive force is produced at the braking coil 6b according as the diaphragm opens. The positive electromotive force is non-invertingly amplified by the operational amplifier OP5 and then is impressed on the operational amplifier OP4 to modify the stopping down movement of the diaphragm by reducing the output voltage of the operational amplifier OP4, i.e. the driving voltage of the driving coil 6a. This takes place in the same manner as in the case of closing the stop diaphragm.

As described above, the aperture area of the diaphragm is decreased when the intensity of the incident light is high and is increased when the intensity is low, so that the quantity of light incident upon the light sensitive element 4 can be kept constant. It goes without saying that, in a case where external light temporarily changes while the light intensity is in a stable and constant state, the quantity of light incident upon the light sensitive element 4 can be kept constant by adjusting the diaphragm value to the change of the external light.

For the sake of simplification of illustration, the switches 21-24 and 21'-24' which are shown in FIGS. 3(a) and 3(b) are omitted in FIG. 4. However, as described in the foregoing, the aperture value is controllable according to the light measurement output while the diaphragm is kept in an open state.

While this specific embodiment employs an electromagnetically operated diaphragm, the invention is not limited to the use of a diaphragm of this type. Diaphragms of other types such as physical diaphragms using liquid crystals and the like are also usable in accordance with the invention. Further, the embodiment employs a light sensitive element such as an SPC for light measurement. However, an image sensor such as a CCD or the like may be arranged to serve also as a light measuring element.

Figure 5:
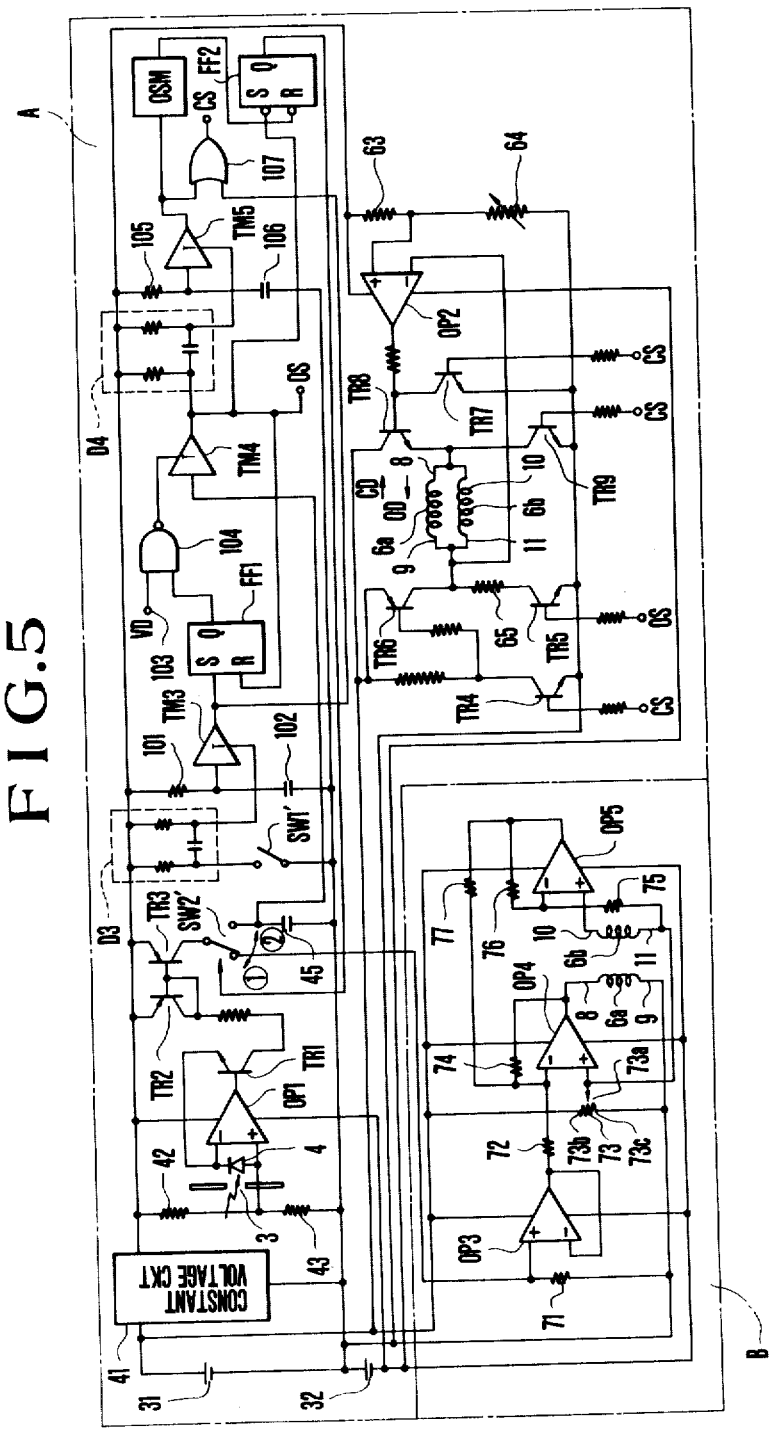
FIG. 5 is a circuit diagram showing the diaphragm drive control circuit of a second embodiment.

The driving control circuit of a second embodiment of the invention utilizes an electronic view finder for observation of an object to be photographed. FIG. 5 shows this control circuit with parts arranged to perform the same functions as those shown in FIG. 4 are denoted by the same numerals and symbols in FIG. 5. In taking a still picture, the component elements shown in FIG. 5 operate as shown in a timing chart by FIG. 6. In taking a motion picture, the switch SW2' is connected to the terminal ① and the operation of the circuitry is performed in exactly the same manner as in the case of FIG. 4.

In taking a still picture, the diaphragm operates in the automatic iris mode during observation of an object to be photographed. The diaphragm then comes to operate in the shutter mode after a shutter release operation. The diaphragm comes back to the automatic iris mode after completion of the still picture taking operation. Referring now to FIGS. 5 and 6, the circuit arrangement operates in the following manner for taking a still picture: When the switch SW1' closes after the shutter release operation, a trigger signal is supplied to a timer TM3 via a differentiation circuit D3. The output level of the timer TM3 then becomes a high level and a shutter closing signal CS is produced via an OR gate 107. The signal CS causes the diaphragm to perform a closing action. A resistor 101 and a capacitor 102 allow the timer TM3 to keep producing the high level output for a period of time required for complete closure of the diaphragm before the output level becomes low. With the output level of the timer TM3 thus changed, a flip-flop FF1 is set. The output Q of the flip-flop is supplied to one of the input terminals of a NAND gate 104. To the other input terminal of the NAND gate 104 is supplied a vertical synchronizing signal VD which instructs commencement of an image storing action by the image sensing light receiving part. Accordingly, the output of the NAND gate 104 changes from a high level to a low level in synchronism with the first synchronizing signal VD supplied after the diaphragm is closed. The low level output of the NAND gate 104 makes the output level of a timer TM4 high. The output of the timer TM4 becomes a shutter opening signal OS. The signal OS opens the diaphragm and sets a flip-flop FF2. The output of the flip-flop FF2 shifts the connecting position of a switch SW2' from a terminal ① to another terminal ② . Therefore, a light measuring capacitor 45 begins to store an electric charge corresponding to the light quantity passing through the diaphragm at about the same time as commencement of the aperture opening action of the diaphragm. When the electric charge stored at the capacitor 45 reaches a prescribed value, the output level of the timer TM4 becomes low and the shutter opening signal OS is no longer produced. Meanwhile, with the output level of the timer TM4 changed, the differentiated wave form produced from a differentiation circuit D4 triggers a timer TM5. The output level of the timer TM5 becomes high and a shutter closing signal is produced via an OR gate 107. The high output level of the timer TM5 is kept high by a capacitor 106 for a period of time required for complete closure of the diaphragm before the output level becomes low. A still picture photographing operation thus comes to an end. When the output level of the timer TM5 becomes low, the flip-flop FF2 is reset via a monostable multivibrator OSM. The output Q of the flip-flop FF2 shifts the position of the switch SW2' from the terminal ② to the terminal ①. The circuit arrangement then comes back to the automatic iris mode.

In this embodiment, as described above, light measurement begins in synchronism with the image storing start signal of the light receiving part which is a CCD, BBD, an imaging tube or the like. Besides, light measurement is arranged to begin almost concurrently with commencement of the opening action of the diaphragm. Therefore, a highly accurate value of light measurement can be obtained.

With an electronic view-finder used, the shift from the automatic iris mode to a shutter mode and vice versa is effected swiftly, so that a still picture photographing operation can be accomplished without giving any unnatural feeling to the photographer.

As will be understood from the foregoing description, the image sensing apparatus according to the invention is provided with first driving control means which variably controls the aperture value of diaphragm means while keeping the diaphragm means in an open state and second driving control means which controls the diaphragm means to open and close it as a shutter. The invented arrangement permits a single diaphragm to perform two functions as an automatic iris and as a shutter thus obviating the necessity of providing the image sensing apparatus with an automatic iris and a shutter.

Further, in this specific embodiment, a single light measuring element is used both for controlling the aperture value of the automatic iris and for controlling the degree of exposure when the diaphragm is used as a shutter. This permits simplification of the structural arrangement of the embodiment. This embodiment further includes a driving coil for driving the diaphragm and a braking coil which detects a diaphragm driving condition. In the case of operation as an automatic iris, the diaphragm is servo-controlled by both of these coils. In the case of operation as a shutter, both of these coils are used for driving the diaphragm. Therefore in the case of operation as the automatic iris, the diaphragm can be stably controlled in a manner suited for taking motion pictures. In the case of operation as a shutter, the shutter can be driven at a high speed suited for taking a still picture with a low degree of power consumption.

While preferred embodiments have been described, variations thereto will occur to those skilled in the art within the scope of the present inventive concepts which are delineated by the following claims.

What we claim:

1. An image sensing apparatus comprising:
    diaphragm means for defining a quantity of light applied from an object to be photographed to a light receiving part which is arranged to perform photo-electric conversion;
    first driving control means for variably controlling the aperture value of said diaphragm means while keeping said diaphragm means in an open state;
    second driving control means for controlling opening and closing of said diaphragm means; and
    selecting means for selecting one of said first and second driving control means.

2. An image sensing apparatus according to claim 1, wherein said apparatus is operatable either in a motion picture taking mode or in a still picture taking mode; said diaphragm means being controlled by the first driving control means when said motion picture taking mode is selected; and said diaphragm means being controlled by the second driving control means when said still picture taking mode is selected.

3. An image sensing apparatus according to claim 1, wherein said second driving control means variably controls the aperture value of said diaphragm means when said diaphragm means is opened.

4. An image sensing apparatus according to claim 1, further including a plurality of driving coils which are arranged to drive said diaphragm means.

5. An image sensing apparatus according to claim 4, wherein said first driving control means uses at least one of the driving coils as a braking coil for braking the stopping down operation of said diaphragm means.

6. An image sensing apparatus according to claim 4, further including switch-over means connectable in parallel with said plurality of driving coils when said selecting means selects said second driving control means.

7. An image sensing apparatus according to claim 4, further including switching means connectable in series with said plurality of driving coils when said selecting means selects said second driving control means.

8. An image sensing apparatus according to claim 1, further including detecting means for detecting said quantity of light applied.

9. An image sensing apparatus according to claim 8, wherein said first driving control means variably controls the aperture value on the basis of the detection output of said detecting means; and said second driving control means controls the quantity of exposure light to be applied to said light receiving part.

10. An image sensing apparatus according to claim 8, wherein said second driving control means is arranged to control, according to the output of said detecting means, the period of time for which said diaphragm means is in an open state.

11. An image sensing apparatus according to claim 8, wherein said second driving control means controls, according to the output of said detecting means, the aperture value of said diaphragm means.

12. An image sensing apparatus according to claim 8, wherein said detecting means is disposed on the side opposite to the object to be photographed relative to said diaphragm means.

13. An image sensing apparatus according to claim 8, wherein said detecting means is a photo-electric conversion element other than said light receiving part.

14. An image sensing apparatus according to claim 8, wherein said second driving control means is provided with storing means for storing the detection output of said detecting means.

15. An image sensing apparatus according to claim 14, wherein said storing means is arranged to begin storing at about the same time as the opening action of said diaphragm means.

16. An image sensing apparatus according to claim 14, wherein said storing means begins storing in synchronism with an image storing start signal of said light receiving part.

17. An image sensing apparatus comprising:
    diaphragm means for defining the quantity of light applied from an object to be photographed to a light receiving part which performs photo-electric conversion;

first driving control means for variably controlling the aperture value of said diaphragm means while keeping the diaphragm means in an open state;

second driving control means for controlling opening and closing of said diaphragm means;

release means for instructing a still picture taking operation; and switch-over means for shifting driving control over said diaphragm means in response to the release action of said release means from the control by said first driving control means to the control by said second driving control means.

18. An image sensing apparatus according to claim 17, wherein said second control means is arranged to perform closing control over said diaphragm means in response to the release action of said release means.

19. An image sensing apparatus according to claim 18, wherein, after said diaphragm means is closed, said second control means performs opening control over said diaphragm means in response to the image storing action of said light receiving part.

20. An image sensing apparatus according to claim 19, further including light measuring means for measuring the quantity of said light applied in response to the closing control over said diaphragm means.

* * * * *